United States Patent [19]

Micek et al.

[11] Patent Number: 4,990,188

[45] Date of Patent: Feb. 5, 1991

[54] ANTI-SLIP COMPOSITION

[75] Inventors: Arthur P. Micek, Trumbell, Conn.; James T. Elfstrum, Yorktown Heights, N.Y.

[73] Assignee: Rhone-Poulenc Basic Chemicals Co., Shelton, Conn.

[21] Appl. No.: 286,187

[22] Filed: Dec. 19, 1988

[51] Int. Cl.$^5$ .................................................. C09K 3/14
[52] U.S. Cl. ...................................... 106/36; 252/160
[58] Field of Search ............. 106/36; 252/160, 174.25

[56] References Cited

U.S. PATENT DOCUMENTS

| | | | |
|---|---|---|---|
| 4,240,919 | 12/1980 | Chapman | 252/99 X |
| 4,668,292 | 5/1987 | Koperdak | 106/36 |
| 4,751,016 | 6/1988 | Tse et al. | 252/174.25 |
| 4,781,759 | 11/1988 | Smith | 106/36 |

FOREIGN PATENT DOCUMENTS 0111467  6/1984  European Pat. Off. .
87/06758 11/1987  PCT Int'l Appl. .

OTHER PUBLICATIONS

Derwent Abstract AN-81-04634D of Japanese A-55 147 598, 1980.
Derwent Abstract AN-74-54377V of Japanese A-49 007 184, 1976.
Derwent Abstract AN-81-59620D of Japanese A-56 079 198, 1981.

Primary Examiner—Patrick P. Garvin
Assistant Examiner—George R. Fourson
Attorney, Agent, or Firm—Paul J. Juettner

[57] ABSTRACT

The coefficient of friction between floors and shoes, particularly in food plants, can be increased by applying thereto, an anti-slip composition comprising sodium bicarbonate and an abrasive, preferably calcium carbonate. Food grade compositions can be provided.

It has also been found that sodium bicarbonate alone or in combination with an abrasive can be used to absorb oil, grease and chemicals from surfaces. An abrasive can be added to improve the anti-slip characteristics of the absorbant.

12 Claims, No Drawings

ANTI-SLIP COMPOSITION

The present invention relates to an anti-slip composition particularly adapted for use in food plants. The present invention also relates to improved compositions for controlling oil and grease deposits on surfaces.

BACKGROUND OF THE INVENTION

Regulated food plants, such as U.S. Department of Agriculture approved meat and poultry processing plants, are required to have approved products on the premises. Some anti-slip compositions, such as a product prepared from pumice, have been approved for use in spot application as absorbants or anti-slip agents in regulated meat plants. However, the pumice product is not approved for food use and cannot come into direct or indirect contact with edible products or packaging materials. These pumice products do not have approval for use in FDA plants regulated by the Food and Drug Administration since only food grade products are allowable in these plants. General purpose anti-slip and oil absorbant agents, such as bentonite clays, volcanic ash and regenerated cellulose, are not approved for use in regulated food plants. A need therefore exists in providing anti-slip agents for those plants.

It is known to use sodium bicarbonate as a anti-slip agent in food plants. Sodium bicarbonate, being water soluble, can be washed down the drain as an effective means for removing the same from the floor.

However, water-solubility can also cause a problem with the use of sodium bicarbonate as an anti-slip agent. When sodium bicarbonate becomes wet, it partially solubilizes forming a slush which has a decreased coefficient of friction over the dry bicarbonate, increasing the slipping danger in comparison to no use at all.

Additionally, in food plants as well as industrial plants, machine shops, automotive service shops and other areas such as driveways or road surfaces, oil and grease spillage is also a problem. In food plants, many of the known oil absorbants cannot be used as they are not approved for use in foods, i.e., food grade. Further, known oil absorbants, such as bentonite clays, suffer from the problem of slow absorption thereby requiring large volumes for effectiveness. Once the granules have absorbed the oil, they are messy to clean up while leaving residual oil on the floor which can cause slipperiness.

An object of the invention is to formulate an anti-slip composition which can be used in food plants which is based on sodium bicarbonate and which does not demonstrate increased slipperiness upon becoming wet.

It would be desirable to provide a composition which would absorb oil quickly and allow it to be washed down the drain leaving a substantially clean floor. It would also be desirable to provide a anti-slip oil absorbant, particularly a product which is food grade and acceptable for use in regulated food plants.

SUMMARY OF THE INVENTION

In accordance with the present invention, there is provided an improved anti-slip composition comprising a majority of sodium bicarbonate and a sufficient amount of a coefficient of friction improving agent, i.e., an abrasive, to provide an anti-slip effect even when wet. A particularly effective abrasive is calcium carbonate which is food approved, washes down the drain and provides the abrasiveness needed. The composition also find use in cleaning up oil and grease as well as chemical spills. It has been found that sodium bicarbonate rapidly absorbs oil or grease as well as chemical spills. The sodium bicarbonate and the absorbed oil or grease can be eliminated by washing away the bicarbonate leaving a clean surface.

DETAILED DESCRIPTION OF THE INVENTION

The sodium bicarbonate useful in the invention is commercially available. The grade selected depends on the final use area. Food grade and better can be used in plants requiring that purity. Industrial grade can be used in other areas. Sodium bicarbonate is also available in a variety of particle size distributions. Selection of particle size is a choice of the manufacturer. To avoid dusting and to provide maximum anti-slip characteristics on a dry surface, particle sizes of at least 65% through 100 mesh are preferred.

The abrasive for use in the composition of the invention is not limited except by practical considerations. The abrasive must be substantially insoluble in the liquid on which it is applied, i.e., generally water or solvent insoluble. In food plants or where required, abrasives which are approved materials for use in that type of facility can be used. The abrasive is preferably inexpensive as the product is a throw-away type product. Industrial grade abrasives can be used in anti-slip and/or oil absorbant products which are used in areas not limited by governmental purity regulations. Abrasive such as silica, diatomaceous earth, pumice, as well as other water insoluble inorganic compounds including dicalcium phosphate and calcium carbonate and the like can be used. The abrasive and the bicarbonate can be effectively combined by dry blending.

As used herein, the term "abrasive" is intended to mean materials which are substantially insoluble in the liquid medium on which they are applied for a period of time sufficient to provide a degree of traction when used in the composition on the surface.

In one embodiment of the invention, particularly advantageous results have been obtained using calcium carbonate as the abrasive. Calcium carbonate can be obtained in food grade purity and a particle size range appropriate to the product. Calcium carbonate has a reported solubility in water of about 0.001 grams/100 milliliters water. In the presence of sodium bicarbonate in aqueous medium, such as on spills of water, the carbonate ion from the bicarbonate may control the dissolution of the calcium carbonate. When the bicarbonate/carbonate is removed from the floor such as by washing, the calcium carbonate can be easily washed away as waste in a solution or dispersion rather than as solids which can collect in the drain or waste area. Slip resistance and easy clean-up can be obtained using the calcium carbonate containing composition of the invention.

The abrasive can be used in a minor amount of the composition sufficient to provide the desired anti-slip characteristics to the bicarbonate in the liquid on the floor, e.g., in water, water and soap, oil, grease and the like. The abrasive is generally used in amounts of less than about 15%, preferably between about 1% an about 10%, and more preferably less than about 5%, depending on the surface and the conditions. Consistent results have been obtained at from about 1% to 5% and preferably at 2.5%±0.5%. Amounts of abrasive greater than about 15% can be used but may present an undesirable level of solids when attempting to clean-up by washing the surface with water.

The anti-slip composition of the present invention can be used in an anti-slip amount in all areas where such risk may occur. The compositions are particularly adapted for use inside buildings or in areas having drains to allow the anti-slip material to be washed off the surface. The compositions of the invention can also be dissolved and removed by hand (mop or vacuum).

The composition can be used on various spills such as water, fluid organic materials, oils, greases, blood and the like. The compositions of the invention can also be applied to chemical spills including acids or bases. Since bicarbonate is a buffer, acid or base spills can be neutralized to render them acceptable to water clean-up while maintaining anti-slip characteristics. The compositions of the invention, when used on oil spills, also demonstrate the ability to break-up the oil allowing the oil to be washed away leaving a substantially clean surface. Additional anti-slip compositions can then be applied to the wet floor to maintain the anti-slip benefits.

The composition can be made available in any convenient container, such as bags, shaker top containers, barrels or pails. The use of distinctive packaging or dye on the product may be desirable to avoid confusion and the possible use of the material in the food. The composition can also be applied as a filing for a sock to surround or acts an absorbant barrier or dam to a spill.

The composition of the present invention is useful on any type surface though it may be more effective on some. Surfaces such as concrete, terrazzo floor or tile, ceramic tile, asphalt or vinyl tile and wood can be mentioned as illustrative surfaces.

Sodium bicarbonate can also effectively be used alone as an absorbant for oils, greases, fluid organic materials, acids, bases and the like. The sodium bicarbonate rapidly absorbs the spill allowing the spill to be easily removed from the surface by flushing such as with water. The sodium bicarbonate alone can be applied to spills on floors, around machinery, on the ground, as a powder or in a sock such as around or under machinery in amounts as needed to perform the task.

The present invention will be more fully illustrated in the examples which follow.

EXAMPLES 1-9

Various anti-slip agents were compounded by dry blending using USP grade sodium bicarbonate having a particle size distribution of 35%-50% on 100 mesh and 10%-20% through 325 mesh and a commercial grade calcium carbonate (Vicron) having a particle size distribution of 100% through 325 mesh and average particle diameter of about 15 microns. The calcium carbonate marked "*" was U.S.P. grade having an average particle diameter of about 8% through about 4.6%. The percentages of each component are given in the table below.

The anti-slip agents were tested to determine their effect on the coefficient of friction between leather (unless otherwise stated) and a floor of varying types as listed below using a slip tester of the NBS—Brungraber design (ASTM Test procedure F-462, tentative acceptance 1985). The following results, given as calculated coefficient of friction, were obtained:

TABLE I

| Ex. | Anti-Slip Agent NaHCO3 % | CaCO3 % | Coefficient of Friction Test 1 | 2 | 3 | Average |
|---|---|---|---|---|---|---|
| 1. | Test Conditions | | Dry - Terrazzo Floor | | | |
| | 100 | — | 3.4 | 3.8 | 4.1 | 3.8 |
| | 99 | 1 | 3.5 | 4.3 | 3.4 | 3.7 |
| | 97.5 | 2.5 | 4.1 | 4.3 | 4.5 | 4.3 |
| | 95 | 5 | 4.1 | 4.2 | 4.2 | 4.2 |
| | 92.5 | 7.5 | 4.6 | 3.8 | 3.9 | 4.1 |
| | 90 | 10 | 4.1 | 3.7 | 3.9 | 3.9 |
| | 97.5 | 2.5* | 3.8 | 3.9 | 3.9 | 3.9 |
| | Control | — | 2.9 | — | — | 2.9 |
| 2. | Test Conditions | | Dry - Asphalt Tile | | | |
| | 100 | — | 3.5 | 3.8 | 3.5 | 3.6 |
| | 99 | 1 | 3.8 | 4.0 | 3.6 | 3.8 |
| | 97.5 | 2.5 | 3.5 | 3.6 | 3.8 | 3.6 |
| | 95 | 5 | 3.7 | 3.8 | 4.2 | 3.9 |
| | Control | — | 3.6 | — | — | 3.6 |
| 3. | Test Conditions | | Oak Floor (Across Grain) | | | |
| | 100 | — | 4.6 | 5.2 | 5.4 | 5.1 |
| | 99 | 1 | 5.8 | 4.8 | 5.0 | 5.2 |
| | 97.5 | 2.5 | 5.0 | 5.8 | 5.6 | 5.5 |
| | 95 | 5 | 4.7 | 4.6 | 4.7 | 4.7 |
| | 92.5 | 7.5 | 5.4 | 5.4 | 5.4 | 5.4 |
| | 90 | 10 | 4.6 | 5.2 | 5.4 | 5.1 |
| | 97.5 | 2.5* | 5.4 | 6.0 | 5.6 | 5.7 |
| | Control | — | 3.6 | — | — | 3.6 |
| 4. | Test Conditions | | Oil - Terrazzo | | | |
| | 100 | — | 4.1 | 4.1 | 3.9 | 4.0 |
| | 99 | 1 | 4.1 | 4.4 | 4.4 | 4.3 |
| | 97.5 | 2.5 | 3.9 | 4.4 | 4.1 | 4.1 |
| | 95 | 5 | 4.1 | 4.1 | 4.5 | 4.4 |
| | 82.5 | 7.5 | 4.1 | 3.9 | 4.2 | 4.1 |
| | 90 | 10 | 3.9 | 4.3 | 3.9 | 4.0 |
| | 97.5 | 2.5* | 3.8 | 3.9 | 4.0 | 3.9 |
| | Control | — | 2.9 | — | — | 2.9 |
| 5. | Test Conditions | | Soap/Water - Terrazzo | | | |
| | 100 | — | 3.9 | 3.7 | 3.8 | 3.8 |
| | 99 | 1 | 4.2 | 3.8 | 4.0 | 4.0 |
| | 97.5 | 2.5 | 4.7 | 4.5 | 4.6 | 4.6 |
| | 95 | 5 | 4.5 | 4.6 | 4.7 | 4.6 |
| | 92.5 | 7.5 | 4.7 | 4.5 | 4.3 | 4.5 |
| | 90 | 10 | 4.8 | 4.7 | 4.6 | 4.7 |
| | 97.5 | 2.5* | 4.6 | 4.7 | 4.6 | 4.6 |
| | Control | — | 2.5 | — | — | 2.5 |
| 6. | Test Conditions | | Soap/Water-Asphalt Tile | | | |
| | 100 | — | 3.4 | 3.4 | 3.7 | 3.5 |
| | 99 | 1 | 3.8 | 3.0 | 3.0 | 3.3 |
| | 97.5 | 2.5 | 2.8 | 3.7 | 4.1 | 3.9 |
| | 95 | 5 | 3.9 | 3.8 | 4.3 | 4.0 |
| | 92.7 | 7.5 | 3.6 | 3.6 | 3.8 | 3.7 |
| | 90 | 10 | 3.9 | 3.4 | 3.7 | 3.7 |
| | 92.5 | 2.5* | 3.9 | 4.0 | 3.8 | 3.9 |
| | Control | — | 1.4 | — | — | 1.4 |
| 7. | Test Conditions | | Dry-Sanded Oak Floor | | | |
| | 100 | — | 4.5 | 4.8 | 5.2 | 4.8 |
| | 99 | 1 | 4.3 | 4.6 | 5.0 | 4.6 |
| | 97.5 | 2.5 | 4.7 | 4.7 | 5.0 | 4.9 |
| | 95 | 5 | 5.0 | 5.3 | 4.7 | 5.0 |
| | 92.5 | 7.5 | 4.7 | 4.8 | 5.0 | 4.8 |
| | 90 | 10 | 4.8 | 4.7 | 5.1 | 4.9 |
| | 97.5 | 2.5 | 4.7 | 5.1 | 4.0 | 4.09 |
| | Control | — | 2.9 | — | — | 2.9 |
| | Unsanded Control | — | — | — | — | 3.6 |
| 8. | Test Conditions | | Soap/Water-Sanded Oak Floor | | | |
| | 100 | — | 5.6 | 6.2 | 5.8 | 5.9 |
| | 99 | 1 | 6.0 | 6.2 | 6.0 | 6.1 |
| | 97.5 | 2.5 | 5.3 | 4.9 | 6.9 | 5.7 |
| | 95 | 5 | 7.5 | 5.5 | 6.0 | 6.3 |
| | 92.7 | 7.5 | 3.9 | 4.0 | 3.9 | 3.9 |
| | 90 | 10 | 5.0 | 5.3 | 5.1 | 5.1 |
| | 97.5 | 2.5* | 5.7 | 5.8 | 6.0 | 5.8 |
| | Control | — | 2.2 | — | — | 2.2 |

Soap/Water-Terrazzo Floor

TABLE I-continued

| | Anti-Slip Agent | | Coefficient of Friction Test | | | |
|---|---|---|---|---|---|---|
| Ex. | NaHCO₃ % | CaCO₃ % | 1 | 2 | 3 | Average |
| 9. | Test Conditions | | | Neoprene Sole | | |
| | 100 | — | 4.6 | 4.8 | 4.6 | 4.6 |
| | 99 | 1 | 4.2 | 4.3 | 4.1 | 4.2 |
| | 97.5 | 2.5 | 4.6 | 4.6 | 4.5 | 4.6 |
| | 95 | 5 | 4.2 | 4.9 | 4.8 | 4.6 |
| | 92.5 | 7.5 | 4.8 | 5.2 | 5.2 | 5.0 |
| | 90 | 10 | 4.3 | 4.5 | 4.8 | 4.5 |
| | 97.5 | 2.5* | 3.9 | 4.2 | 4.8 | 4.3 |
| | Control | — | 3.0 | — | — | 3.0 |

The effectiveness of the anti-slip composition of the invention varies depending on the test conditions. The results are based on the ASTM test F-462 and limited according to the inherent limitations of that test. The results show the trend that abrasive quantities ranging from abut 5% to about 2.5% are most effective in improving the coefficient of friction on all surfaces under all test conditions.

EXAMPLE 10

A small amount of virgin motor oil was spread onto a 6×6 inch (15.24×15.24 cm) square of varnished parquet floor tile. An anti-slip composition of the invention comprising a dry blend of about 97.5% sodium bicarbonate and 2.5% calcium carbonate was sprinkled on the oil. The oil immediately lost its glossy appearance and appeared to be absorbed by the composition of the invention. The oiled surface having the composition of the invention applied thereto had a gritty feel and was no longer slippery to the touch. Additional anti-slip agent was applied and substantially all the oil was absorbed. The anti-slip composition with the oil absorbed therein could be brushed away. A substantially clean surface was obtained upon washing with water though a sufficient film of oil remained to cause the water to bead.

Oil applied to a like surface was only slowly absorbed by an industrial grade clay oil absorbant. Upon removal of the absorbant, there was sufficient oil remaining that a pumice oil absorbant could be applied. The pumice absorbed the oil rapidly but showed no anti-slip feeling to the fingers.

What is claimed is:

1. An anti-slip composition for a surface which can be dry or may have liquid thereon comprising a major amount of sodium bicarbonate and a minor amount of a coefficient of friction improving agent which is a substantially water-insoluble inorganic abrasive, said agent being substantially insoluble in the liquid which may be on the surface to which the composition is applied for a period of time sufficient and in an amount sufficient to increase the coefficient of friction over sodium bicarbonate alone, said coefficient of friction improving agent being present in an amount of less than about 15% by weight based on the dry weight of the sodium bicarbonate and the agent.

2. An anti-slip composition as recited in claim 1, wherein said abrasive is present in an amount ranging from about 1% to about 10% by weight based on the dry weight of the sodium bicarbonate and the abrasive.

3. An anti-slip composition as recited in claim 1, wherein said abrasive is present in an amount ranging from about 1% to about 5% by weight based on the dry weight of the sodium bicarbonate and the abrasive.

4. An anti-slip composition as recited in claim 1, wherein said abrasive is selected from the group consisting of silica, bentonite clay, diatomaceous earth, calcium carbonate and dicalcium phosphate.

5. An anti-slip composition as recited in claim 1, wherein said abrasive is calcium carbonate.

6. An anti-slip composition as recited in claim 5, wherein the calcium carbonate has a particle size distribution of less than 325 mesh.

7. An anti-slip composition as recited in claim 1, wherein the sodium bicarbonate has a particle size distribution of from about 35% on 100 mesh to about 10% through 325 mesh.

8. An anti-slip composition comprising from about 85% to about 99% by weight sodium bicarbonate and from about 15% to about 1% by weight calcium carbonate.

9. A process for increasing the coefficient of friction between two surfaces, one of which may have a liquid thereon, which comprises applying to one surface an anti-slip composition comprising a major amount of sodium bicarbonate and a minor amount of a coefficient of friction increasing agent which is an inorganic abrasive that is substantially insoluble in the liquid and which is present in an amount of less than about 15% by weight based on the dry weight of the sodium bicarbonate and the agent for a period of time sufficient to increase the coefficient of friction between the surfaces.

10. A process as recited in claim 9, wherein said abrasive is calcium carbonate.

11. A process as recited in claim 9, which includes the further step of dissolving the sodium bicarbonate and any dissolvable coefficient of friction improving agent on the surface with water and removing the dissolved sodium bicarbonate and any dissolved coefficient of friction improving agent from the surface by removing the water solution along with any undissolved coefficient of friction-increasing agent.

12. A process as recited in claim 9, wherein said surface has oil thereon and said oil is absorbed by said composition.

* * * * *